United States Patent [19]

Green

[11] 4,420,830
[45] Dec. 13, 1983

[54] DISC MOUNTING AND CENTERING DEVICE

[75] Inventor: Keith Green, Kinross-Shire, Scotland

[73] Assignee: Burroughs Corporation, Detroit, Mich.

[21] Appl. No.: 270,198

[22] Filed: Jun. 3, 1981

[30] Foreign Application Priority Data

Jul. 1, 1980 [GB] United Kingdom ............... 8021514

[51] Int. Cl.³ ............................................. A63D 7/00
[52] U.S. Cl. ................................... 369/261; 369/270; 360/99
[58] Field of Search ................ 29/271, 283.5, 281.5, 29/281.1; 360/99; 369/258, 261, 270

[56] References Cited

U.S. PATENT DOCUMENTS

| 3,071,381 | 1/1963 | Schneider | 369/270 |
| 3,561,768 | 2/1971 | Castagna | 369/270 |
| 3,768,815 | 10/1973 | Mathurin | 369/261 |

FOREIGN PATENT DOCUMENTS

| 53-68203 | 6/1978 | Japan | 369/270 |
| 1388089 | 3/1975 | United Kingdom . | |

OTHER PUBLICATIONS

Japanese Publication JP 79/00139, entitled "Device for Attaching Disk-Like Recording Medium", 12/27/79.
Beuch, W. E., Lightner, G. E.; and Zell, M. N., "Spider Collet for Flexible Magnetic Disks" IBM Technical Disclosure Bulletin, vol. 20, No. 6, Nov. '77.

Primary Examiner—James G. Smith
Assistant Examiner—Steven P. Schad
Attorney, Agent, or Firm—David G. Rasmussen; Kevin R. Peterson; Edmund M. Chung

[57] ABSTRACT

A disc mounting and centring device, for use in a disc file employing removable, flexible rotary discs comprises guides 52 for locating a disc 40 such that a central and circular locating hole 48 in the disc 40 is approximately parallel planar and coaxial with a circular recess 12 of substantially the same diameter as the hole 48, set in the flat top of a rotating cylindrical spindle 10, a frusto conical expandable shell 20 for insertion through the hole 48 into the recess 12 having a largest, unexpanded diameter less than that of the hole 48, a lip 22 at the largest diameter end of the shell 20, of greater diameter than the hole for engaging the disc 40 with the spindle 10 as the shell 20 enters the recess, and a frusto conical expander 30 for insertion into the shell 20 firstly to expand the shell 20 until it is constrained by the recess 12 and secondly, by applying axial force in excess of that required to expand the shell 20 for pressing the lip 22 against the spindle 10, with said excess force to clamp the disc 40.

11 Claims, 7 Drawing Figures

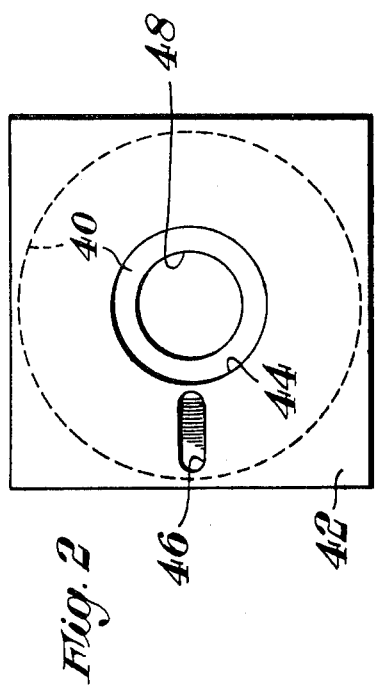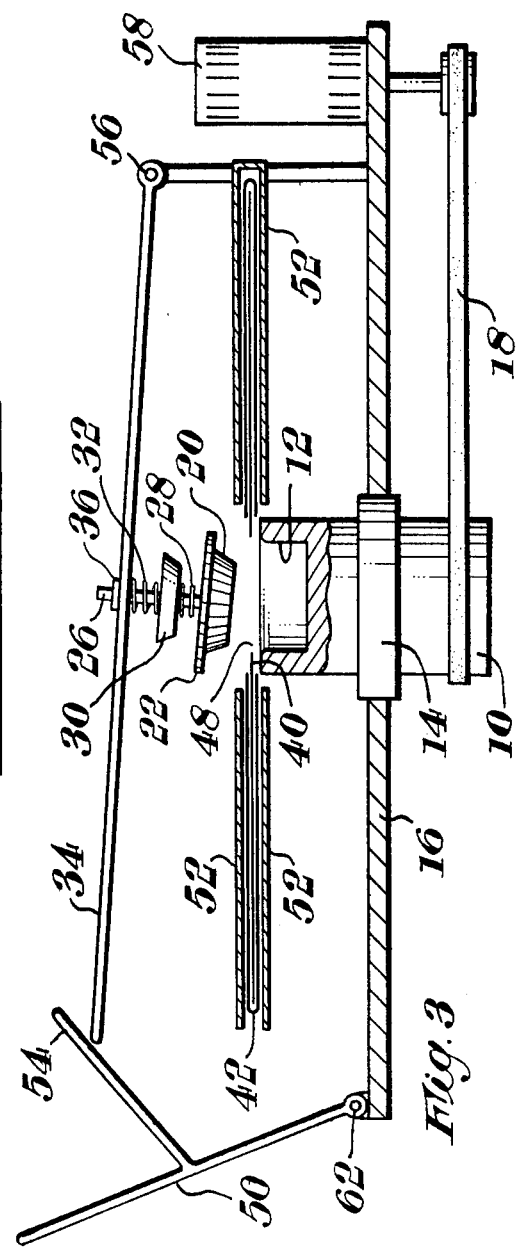

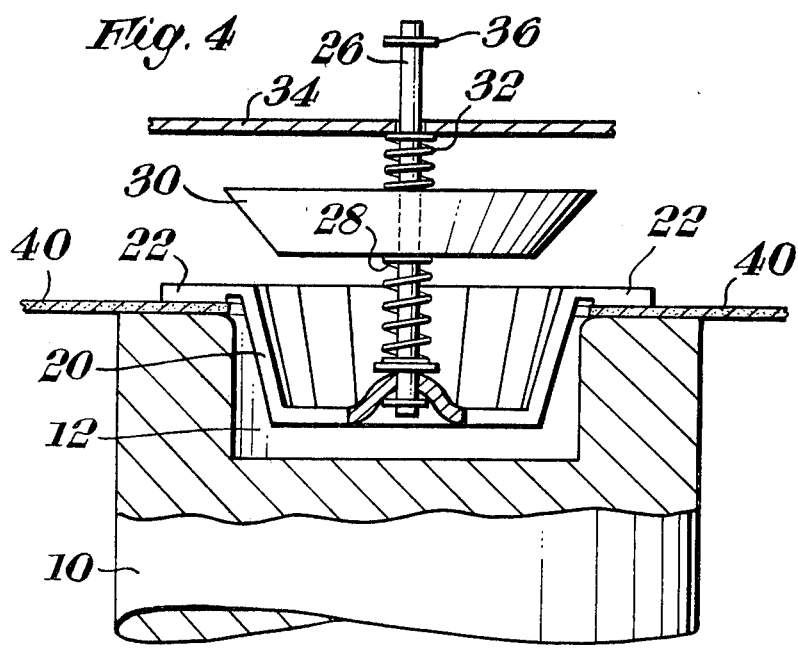
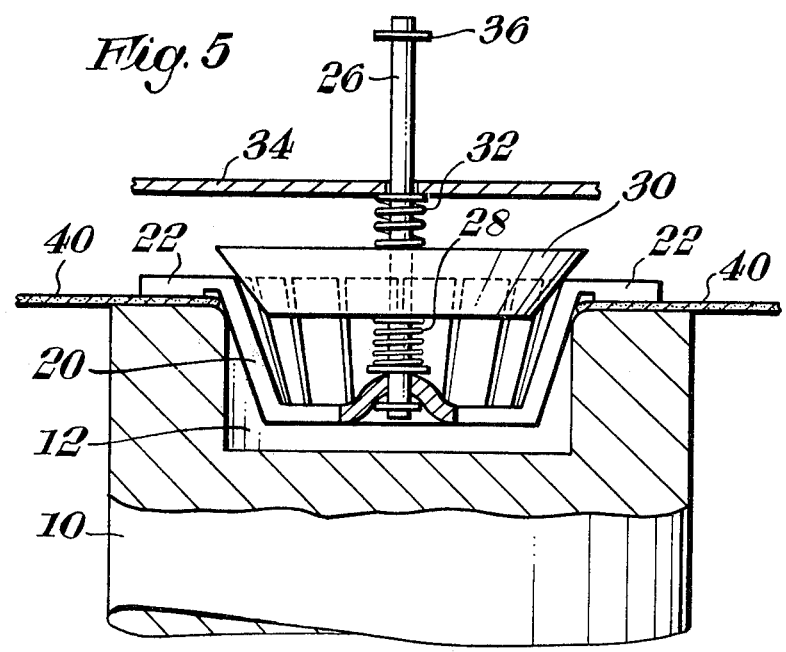

DISC MOUNTING AND CENTERING DEVICE

The present invention relates to a disc mounting and centering device for use in a disc file employing removable flexible discs provided with a central, circular locating hole.

Flexible removable discs are much used in magnetic data storage disc files. Data is generally stored in a plurality of concentric circular tracks. Trends towards higher data storage capacity have necessitated the use of more tracks on each disc, each of which is radially narrower. Radial read/write head position tolerances are thereby tightened.

Centring errors on the disc cause the centers of rotation of the disc to be non-coincident from insertion to insertion. Such errors, and differences therebetween, cause a track to perform a sinusoidal, radial deviation from its supposed radial position with amplitude equal to the distance between the centers of rotation on recording and playback and period equal to the period of rotation of the disc. Increasing track densities also necessitate a reduction in this effect.

In the current art a mylar disc, of the order of 0.08 mm thick is positioned for the insertion of a frusto conical compressible shell with larger unstressed diameter greater than and least diameter less than that of the locating hole, through the locating hole, smaller end foremost into a circular recess in a rigid, rotating spindle, the recess being of substantially the same diameter as the hole and concentric with the axis of rotation of the spindle. The shell has a lip at its non-apex end which carries the disc onto the spindle. The shell is compressed as it forces its way through the disc locating hole, being finally restrained by the edges of the recess. This method is acceptable for track densities up to around 24 per radial centimeter, but the centering errors inherent therein make it difficult to implement for higher track densities.

Another approach involves the insertion through the disc locating hole, coaxially into the recess, of a circular elastic, expandable member with unstressed diameter less than that of either the recess or the hole. Tabs are provided on the member which firstly carry the disc onto the top of the recess, secondly themselves engage the top of the recess in such a manner that, as the member is further inserted, it is forced to expand until restrained by the recess, thus centering the disc over the recess, and thirdly transfer a clamping force on the centerd disc against the top of the recess.

The interior of a disc drive provides an environment of sustained elevated temperatures where elastic polymeric parts, such as might be used in a disc centering device as described, are subject to dimensional creep, especially when stressed, whose rate of progress increases with temperature.

The precision of disc centering is highly dependent upon the magnitude of the forces applied to the disc. In particular, it is essential to control the amount of "stretch" imparted to the disc centering hole as well as maintaining sliding and gripping forces within known limits. It is therefore not desirable that the action of a disc centering and mounting mechanism depend for its accuracy upon elastic components whose dimensions and restitution coefficients are an uncertain and varying function of age. It is therefore desirable to provide a disc centering and mounting mechanism whose action is substantially independent for its accuracy from the dimensions and elastic restitution coefficients of any elastic parts.

The present invention consists in a disc mounting and centering device comprising a rotatably mounted support member with a face perpendicular to its axis of rotation having a circular coaxial opening therein, guide means for locating a disc such that a central, circular locating hole in the disc is substantially over said opening, transport means for engaging the disc with said face, an expandable, circularly symmetric shell for free reversible insertion through the hole in the disc coaxially into said opening and a rigid circular expander, reversibly insertable into said shell so as to increase the diameter of said shell to engage both the inside of the hole in the disc and the inside of said opening, and clamping means for clamping the disc to said face.

In a first preferred embodiment the support member is a cylindrical spindle, the opening is of substantially the same diameter as the locating hole in a disc, the expandable member is an elastic frusto conical shell whose larger diameter is less than that of the locating hole in a disc, the expander is a frusto conical expander insertable into the shell, the transport means is a lip on the larger diameter end of the shell for carrying a disc onto the face of the spindle as the shell is inserted into the opening, and the clamping means is also the lip which, subsequently to the shell having been expanded until restrained by the edge of the opening, transfers the force of insertion of the expander into the shell in excess of that required to expand the shell as a clamping force of a disc onto the face. The shell and the expander are preferably both centrally rotatably mounted on a pin which is insertable coaxially into the recess, the shell being restrained to remain on the recess end of the pin and the expander being free to slide on the pin. The pin preferably passes through a plate in a free sliding manner. The plate is preferably movable towards and away from the recess. The expander is preferably separated from the shell by a first spring on the pin and the expander is preferably separated from the plate by a second spring on the pin.

In a second preferred embodiment the members are the same as for the first preferred embodiment save that the expander alone is rotatably affixed to the recess end of the pin, the shell being preferably affixed to the expander by a plurality of fingers passing through a corresponding plurality of through penetrating holes in the expander, the fingers being free to slide in the through penetrating holes but restrained from disengaging therefrom by a corresponding plurality of hooks at their distal ends. The fingers are preferably of such a length that they allow the expander to disengage from the interior of the shell. The materials of the expander, shell and recess are preferably chosen such that the coefficients of friction allow the expander to disengage from the interior of the shell before the shell disengages from the inside of the recess whenever the pin is withdrawn from the recess. The first spring is preferably omitted.

The operation of the present invention will be further described, by way of an example, in the following description in conjunction with the appended drawings, in which;

FIG. 2 shows details of the flexible disc in its jacket.

FIG. 3 shows in cross section, the elements of FIG. 1 after insertion of the disc into the disc drive.

FIG. 4 shows in cross section the elements of FIG. 1 operational on the disc at the completion of the first movement of the disc centering process.

FIG. 5 shows in cross section the elements of FIG. 4 at the completion of the second movement in the disc centering process.

Figure 1:
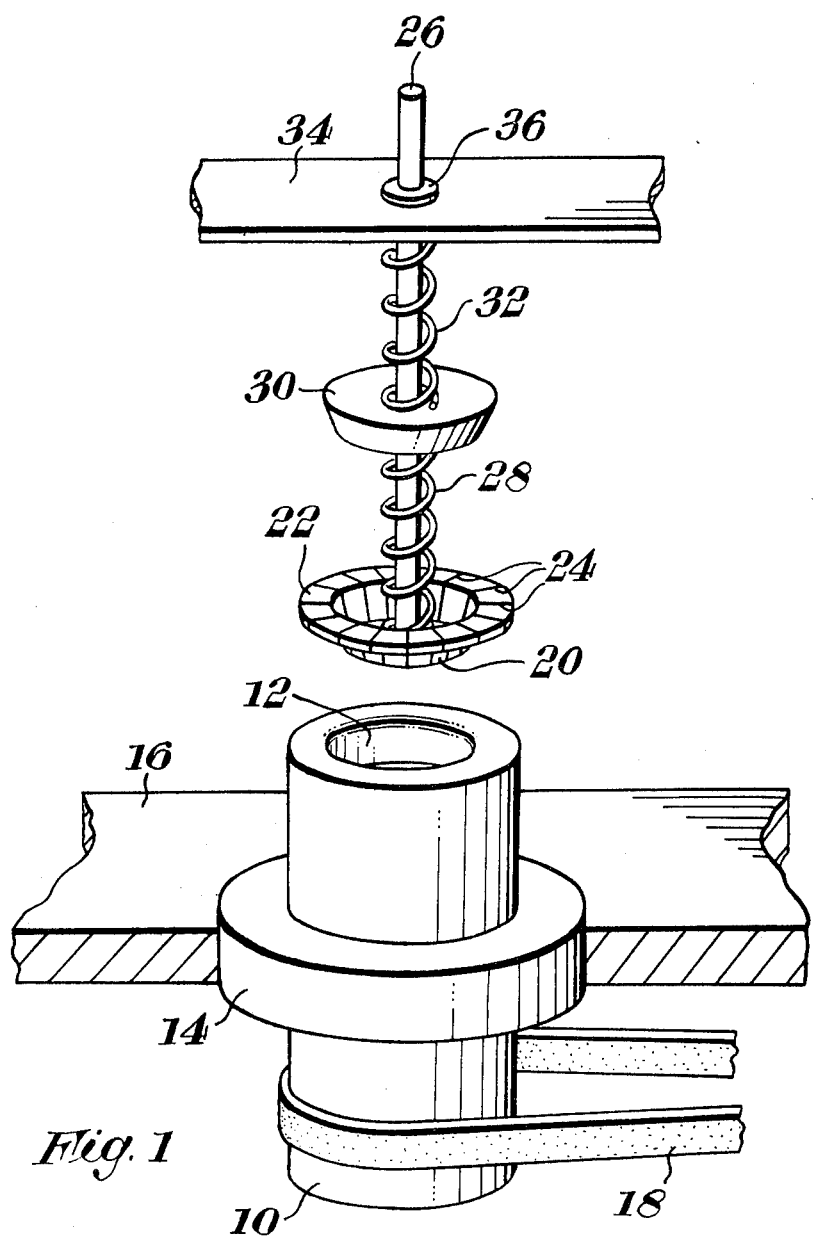
FIG. 1 shows an expanded view of the disc centering device in a disc drive.

FIG. 1 shows the disc mounting and centering device comprising a cylindrical metal spindle 10 in the top of which is set a circular concentric recess 12. The spindle 10 is free to rotate about its axis on a bearing 14 affixed to the main body of a disc file 16. The spindle is caused to rotate by a driving belt 18.

A frusto conical shell 20 is centrally affixed to and free to rotate about a carrying pin 26 on which it is prevented from changing its vertical position by means of a pair of circlips or similar restraints. The shell 20 is coaxially disposed above the recess 12, has a lip on its larger end parallel to the end of the spindle 10, and is provided with a plurality of radial cuts or missing segments 24 reaching almost to its central fixing point, whereby it is rendered expandable. The shell 20 is fabricated from an elastic polymer and when free of all forces possesses a maximum diameter less than that of the recess 12.

A first helical spring 28 on the pin 26 keeps the shell 20 apart from a frusto conical expander 30. A second helical spring 32 also on the pin 26 keeps the expander 30 clear of a bearing plate 34. The second spring 32 has a lower elastic restitution force per unit compression distance than does the first spring 28.

The expander 30 is fabricated from any rigid material which slides freely when in contact with the material of the shell 20, and is axially penetrated by and free to rotate about the pin 26, its smaller diameter end being nearest the shell 20. The expander 30, when inserted into the shell 20, is capable of expanding the shell to have a maximum external diameter which is larger than the diameter of the recess 12.

FIG. 2 shows details of a flexible disc 40 in its protective and supporting jacket 42. The disc 40 is made from 0.08 mm thick mylar sheet coated on one or both sides with a thin layer of magnetic medium. The semi rigid jacket 42 is square around 1.5 mm thick, has a first central through penetrating circular aperture 44 through which access may be gained to either side of the center of the disc 40, and has a second through penetrating aperture 46 through which a magnetic read/write head may gain access to the recording surface on either side of the disc 40. The disc itself 40 is provided with a central locating hole 48 whose diameter lies within ±0.025 mm of the diameter of the recess 12 of the spindle 10.

FIG. 3 shows the relative dispositions of the members of the disc file 16 when the disc 40, in its jacket 42 is first inserted through a door 50, between horizontally and vertically positioning guides 52 to come to a stop with its central hole 48 substantially over the recess 12. The door 50, pivoted on the disc file by a hinge 62 carries a plate driving lever 54 which, as the door 50 is closed, engages the plate 34 causing it to descend towards the spindle 10. The plate is pivoted on the plate hinge 56 and its length is such that its center descends with a substantially vertical trajectory. A constant speed electric motor 58 drives the belt 18 which turns the spindle 10.

It is to be noted that the unstressed maximum external diameter of the shell 20 is smaller than the smallest diameter hole 48 to be encountered in the disc 40.

FIG. 4 shows the situation achieved by partial closing of the door 50 where the shell 20 descends through the hole 48 into the recess 12, the lip 22 carrying the disc 40 onto the face of the spindle 10. The second spring 32 is compressed more than the first spring 28 and the expander 30 thereby maintains a clearance from the shell 20.

FIG. 5 shows the situation achieved by fully closing the door 50 where the expander 30 is pushed into the rear of the shell 20 which is forced to expand until it is restrained by the inside of the recess 12, thereby aligning the hole 48 over the recess 12. The shell 20 on being restrained by the recess 12 can no longer expand and the downward force of the cone 30, additional to that required to expand the shell 20 to engage the recess 12, is transferred as a clamping force on the disc 40 against the spindle 10 via the lip 22. The magnitude of the clamping force is determined by the elastic restitution coefficients of the springs 28 and 32, the amount of force required to expand the shell 20 and the extent of downward travel of the plate 34. When clamped, the disc 40 rotates with the spindle 10.

Figure 6:
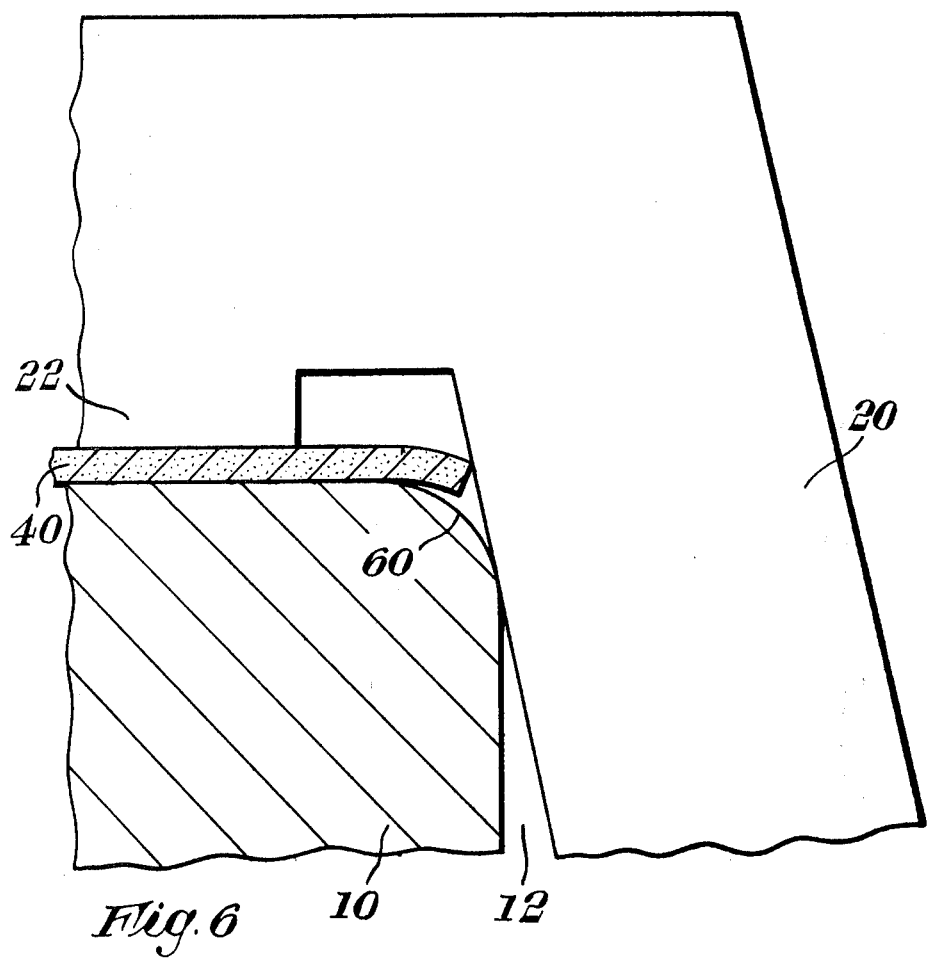
FIG. 6 shows detail of FIG. 5 with emphasis on the function of the rounded edge of the recess.

FIG. 6 shows how a rounded edge 60 on the recess 12 with a radius of curvature in the range of 0.13 to 0.26 mm, provides for the takeup of excess disc material resultant firstly from the conical nature of the shell 20 causing the diameter of that portion protruding above the recess 12 to be of a greater diameter than the recess 12, and secondly from the diameter of the hole 48 in the disc 40 being of a lesser diameter than the recess 12. The curved edge 60 allows the disc material a locus along which to lie which avoids undue stretching of the hole 48.

The hole 48 is 38.1 mm in diameter and the apex angle of the shell 20 when expanded to be restrained in the recess lies in the range 5° to 10°.

It will be apparent that the expander 30 and the shell 20 may together or separately be replaced by any circularly symmetric means capable of performing the same function. It will similarly be apparent that the plate 34 may be in the other form and caused to descend by different agency. The spindle need not be cylindrical and may be provided with a recess at both ends enabling it to support two discs.

Figure 7:
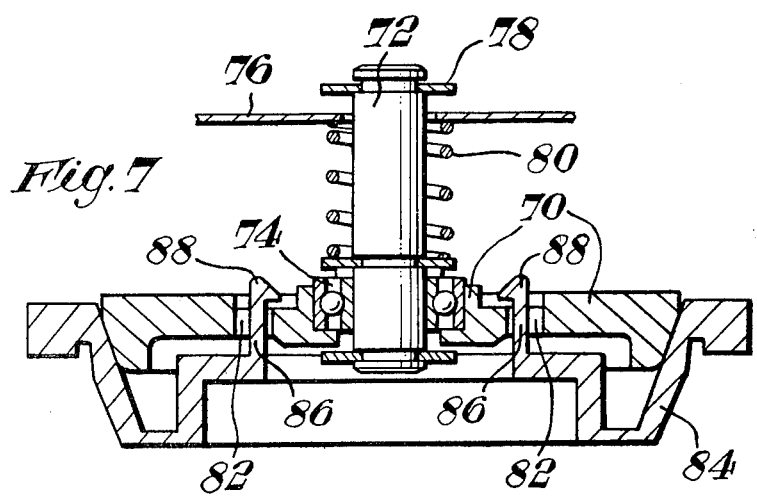
FIG. 7 shows a cross sectional view of the shell and expander assembly of the second preferred embodiment.

FIG. 7 shows a cross section through the expander and shell assembly of the second preferred embodiment.

An expander 70 is rotably affixed to a pin 72 by means of a bearing 74. The pin 72 passes through a rising and descending plate 76 in a freely sliding manner and is restrained from disengaging therefrom by a circlip 78. A spring 80 provides a separating force between the plate 76 and the expander. The expander 70 is provided with a plurality of through penetrating holes 82 arranged circularly symmetrically around the bearing 74. A circularly expandable shell 84 is provided with a corresponding plurality of fingers 86 which pass through the holes 82 in a freely sliding manner and hold the shell 84 onto the expander 70 by means of a corresponding plurality of hooks 88, one at the distal end of each of the fingers 86. The fingers 86 are sufficiently long for the expander 70 to disengage from the inside of the shell 84 before the hooks 88 engage the expander 70.

The second preferred embodiment operates in the same manner as does the first preferred embodiment, the pin 72 being inserted coaxially into a circular recess, and the expander 70 engaging the inside of the shell 84 to expand it to center and clamp and disc as the plate 76 descends. In the second preferred embodiment there is only one spring 80 and the material of the expander 70, the shell 84 and the recess are chosen such that their relative coefficients of friction allow the expander 70 to disengage from the inside of the shell 84 before the shell disengages from the inside of the recess whenever the pin 72 is withdrawn from the recess. As the expander 70 is withdrawn with the pin 72 the hooks 88 engage the expander 70 and pull the disengaged shell 84 up with the expander 70.

What I claim is:

1. In an assembly for centering a flexible disc with a central locating hole, the assembly having a rotatable spindle with a face and apparatus for centering the flexible disc on the face, the rotatable spindle having a circular coaxial opening in the face, the disc central locating holes being centered about the spindle opening, the apparatus for centering including an expandable circular shell and a rigid expander, the shell insertable through the central locating hole into the spindle opening, the expander insertable into the shell to expand the shell to engage both the inside of the hole in the disc and the inside of the opening to center the disc, the improvement comprising:

coupling means including fingers on said shell intermediate between said shell and expander and including engaging means for said fingers on said expander, said coupling means being intermediate between said expander and said shell, said engaging means on said expander mechanically engaging said fingers on said shell to withdraw said shell from said opening whenever said expander is withdrawn more than a predetermined distance from said opening.

2. An assembly for mounting and centering a disc with a central locating hole comprising:

a rotatably mounted spindle with a face perpendicular to its axis of rotation having a circular, coaxial opening set in said face;

an expandable, circularly symmetric shell, freely insertable through said central locating hole in said disc coaxially into said spindle opening;

a rigid expander, insertable into said shell to expand said shell to engage both the inside of said hole in said disc and the inside of said opening to center said disc;

a clamp, operable to clamp said disc to said face to be co-rotational with said spindle; and, coupling means including fingers on said shell intermediate between said shell and expander and including engaging means for said fingers on said expander, said coupling means being intermediate between said expander and said shell and said expander mechanically engaging said shell to withdraw said shell from said opening whenever said expander is withdrawn more than a predetermined distance from said opening.

3. A device according to claim 2 wherein said coupling means further comprises said engaging means for said fingers being a plurality of holes through-penetrating said expander, and a plurality of hooks, one situated at each distal end of said plurality of fingers, wherein said fingers pass, one through each of said plurality of holes, and wherein said hooks engage the surface of said expander remote from said shell whenever the distance between the points of location of said fingers on said shell and said remote surface equals the length of said fingers.

4. A device according to claim 3 wherein said shell is an elastic, frusto-conical shell with greatest, unstressed diameter less than the diameter of said hole in said disc for insertion smaller end foremost through said hole, and wherein said expander is frusto-conical for insertion, smaller end foremost into said shell.

5. A device according to claim 4 wherein said clamping means comprises a lip on said shell for pressing said disc against said face and means for imparting to said expander an excess force over that required to expand said shell for the axial component of said excess force to clamp said disc between said face and said lip.

6. A device according to claim 5 comprising a plate, means for moving said plate away from and towards said spindle, a pin, through-penetrating said plate in a sliding manner with non-spindle end restrained from disengagement therefrom and disposed coaxially in said opening at the nearest approach of said plate to said spindle, means for affixing said expander in a freely-rotating coaxial manner to the spindle end of said pin, a spring for providing a separating force between said expander and said plate, where said plate is movable towards said spindle more closely than is required to expand said shell for said spring to supply said excess force.

7. An assembly for mounting and centering a flexible disc with a central locating hole, the assembly having a rotatable spindle with a face and apparatus for centering and clamping the flexible disc on the face, the rotatable spindle having a circular coaxial opening in the face, the disc central locating hole being centered about the spindle opening, the apparatus for centering and clamping extending through the disc central locating hole and expanding to center and clamp the flexible disc on the rotatable spindle, comprising:

said rotatable spindle having a rounded edge at the junction of said face and said spindle opening, said rounded edge providing a void between said spindle and said apparatus for centering and clamping, said void being for the accommodation of elastically displaced disc material as said apparatus for centering and clamping expands against the inside of said disc central locating hole and said spindle opening;

said apparatus for centering and clamping having an expandable, circularly symmetric shell, a rigid expander, and a clamp, said shell freely insertable through said central locating hole in said disc coaxially into said spindle opening, said expander insertable into said shell to expand said shell to engage both the inside of said central locating hole in said disc and the inside of said spindle opening to center said disc, said clamp operable to clamp said disc to said face to be co-rotational with said spindle; and, a coupling means including fingers on said shell intermediate between said shell and expander and including engaging means on said expander to engage said fingers, said coupling means intermediate between said expander and said shell for said expander to mechanically engage said shell and withdraw said shell from said opening whenever said expander is withdrawn more than a predetermined distance from said opening.

8. A device according to claim 7 wherein said coupling means further comprises said engaging means for said fingers being a plurality of holes through-penetrating said expander, and a plurality of hooks, one situated at each distal end of said plurality of fingers, wherein said fingers pass, one through each of said plurality of holes, and wherein said hooks engage the surface of said expander remote from said shell whenever the distance between the points of location of said fingers on said shell and said remote surface equals the length of said fingers.

9. A device according to claim 8 wherein said shell is an elastic, frusto-conical shell with greatest, unstressed diameter less than the diameter of said hole in said disc for insertion smaller end foremost through said hole, and wherein said expander is frusto-conical for insertion, smaller end foremost into said shell.

10. A device according to claim 9 wherein said clamp comprises a lip on said shell for pressing said disc against said face, and means for imparting to said expander an excess force over that required to expand said shell for the axial componant of said excess force to clamp said disc between said face and said lip.

11. A device according to claim 10 comprising a plate, means for moving said plate away from and towards said spindle, a pin, through-penetrating said plate in a sliding manner with non-spindle end restrained from disengagement therefrom and disposed coaxially in said opening at the nearest approach of said plate to said spindle, means for affixing said expander in a freely-rotating coaxial manner to the spindle end of said pin, and a spring for providing a separating force between said expander and said plate, where said plate is movable towards said spindle more closely than is required to expand said shell for said spring to supply said excess force.

* * * * *